Jan. 22, 1952 W. POULIART 2,583,014
AUTOMATIC CONTROL OF FINAL SELECTORS
Filed Feb. 14, 1947 7 Sheets-Sheet 1

Fig.1.

W. H. P. POULIART
INVENTOR.

BY

Jan. 22, 1952 W. POULIART 2,583,014
AUTOMATIC CONTROL OF FINAL SELECTORS
Filed Feb. 14, 1947 7 Sheets-Sheet 2

Fig.2.

W. H. P. POULIART
INVENTOR.

BY

Jan. 22, 1952 W. POULIART 2,583,014
AUTOMATIC CONTROL OF FINAL SELECTORS
Filed Feb. 14, 1947 7 Sheets-Sheet 3

Fig.3.

W. H. P. POULIART
*INVENTOR.*

BY *Robert Harding Jr.*

Patented Jan. 22, 1952

2,583,014

UNITED STATES PATENT OFFICE 2,583,014

AUTOMATIC CONTROL OF FINAL SELECTORS

Willy Pouliart, Antwerp, Belgium, assignor to International Standard Electric Corporation, New York, N. Y., a corporation of Delaware Application February 14, 1947, Serial No. 728,549
In the Netherlands June 12, 1942

Section 1, Public Law 690, August 8, 1946
Patent expires June 12, 1962

9 Claims. (Cl. 179—18)

The present invention relates to automatic or semi-automatic telephone systems where selection is effected by means of single-motion type switches set to given positions under the control of register circuits. It deals particularly with final selectors in which two numerical selections must be carried out successively, the tens and units selections.

The principles on which the present invention is based have already been described in U. S. Patent No. 2,444,065 and U. S. application Serial No. 728,548, filed February 14, 1947, now Patent No. 2,547,043 dated April 3, 1951. The first of these covers the general method of testing by identifying a predetermined difference of potential between the ends of a signaling wire during the process of selection. The second application covers group selection.

The present system of final selection embodies the advantages of the group selecting arrangement, chief of which are the large number of possible simultaneous selections, and the absence of secondary control circuits, the selection being controlled direct from a register.

The main features of the present invention have to do with the application of the principles of said prior applications to effect the successive tens and units selections over the same test level in the final selector, and with the testing during group or P. B. X hunting.

According to the invention, the numerical indication received in the register applies to the signaling wire a predetermined direct potential characteristic of the number dialed. The selector is set in motion under the control of the register and connects the signaling wire to various direct current potentials marking its terminal sets. Of all the differences of potential to which the ends of the signaling wire may be subjected during the movement of the selector, only one is indicative of the desired terminal set to be selected, and causes the register to stop the selector in the corresponding position.

The selector performs, therefore, two successive numerical selections in accordance with corresponding numerical indications received in the register and characterizing the terminal set to be finally selected.

According to another feature of the invention the selector effects via the same brush member two successive numerical selections, the first of which chooses one out of a plurality of groups of terminal sets located at intervals in the selector bank, and the second of which selects one of the terminal sets in the group chosen during the first selection and then hunts for a set following the last-mentioned terminal set.

According to another feature, the different terminal sets of the selector bank may be marked by various direct current potentials of such magnitude that during the first or second selection the differences of potential to which the ends of the signaling wire are subjected are of insufficient value or the wrong sign to cause the response of the detector in the register, no matter what number is dialed.

Another feature of the invention provides that the magnitudes of the direct current marking potentials used are such that to satisfy the operating conditions the connections of the signaling wire to the test detector must be reversed between the first and the second selection, thus rendering any difference of potential capable of causing a response of the detector during one selection incapable of doing so during the other selection.

It is a further feature of the invention that the continuation of the first selection is insured in case the detector responds for the first time to a difference of potential different from that applied to it when the wanted position is encountered. The first response is followed by a second response which causes the selector to continue its rotation while the connections of the signaling wire to the detector are reversed and the register end of the signaling wire placed at such a potential that none of the potentials marking the desired terminal sets can cause a new response of the detector. However, a suitable potential marking another terminal set causes a third response of the selector, whereupon the conditions existing before the first response are reestablished.

Still another feature is that the marking potentials are connected to the terminal sets of the selector bank in such order that during the second (units) selection, the first difference of potential capable of causing the response of the detector is that to which the ends of the signaling wire are subjected when the wanted terminals are encountered.

The terminal set chosen by the first selection may be chosen also by the second selection without moving the selector switch after the first selection. The detector will in this case respond in a local circuit in the register when the units digit is received.

The invention contemplates the use of a selector having a home position, whereby the order of connection in the selector bank of the marking potentials relative to the first selection, as well as the order of connection of the register and potentials characterizing all possible digits for the first selection is so chosen that the selector starting from the home position may rotate before the entire number is received in the register, provided that it be sufficiently delayed with regard to the beginning of the reception to insure that the difference of potential to which the ends of the signaling wire are subjected cannot reach the required minimum value and sign before the digits have been completely received in the register.

Another feature is that several terminal sets, excepting those concerned with the first selection, are so grouped that the potentials marking them have all the correct sign, and at least the minimum value required to operate the detector during the second selection. The marking potentials of all terminal sets except the last of the group are controlled over a break contact which, when open, indicates the busy condition of the line to which the corresponding terminal set gives access, the arrangement being such that when the tens digit is received in the register, the first terminal set giving access to an idle line will be selected in the group.

In order to make clear the various considerations which have led to the development of the present system of final selection, it is necessary to recall the main characteristics of the numerical selection as outlined in the system of group selection covered by U. S. application Serial No. 728,548, filed February 14, 1947. In accordance with said application the various outlets are formed into groups each of which contains only outlets to the same direction. The numerical selection is effected by identifying the beginning of a wanted group and thereafter introducing the necessary conditions for choosing a free outlet in the selected group. In case no free outlet is found in the wanted group, the end of the group is also signaled to remove the free hunting condition and thus prevent a free outlet from being picked up in an unwanted group. After the end of the wanted group has been signaled, a third indication is given at a suitable moment, indicating that the selection process may be restarted, whereupon the initial conditions are reestablished in the register.

The means employed to insure the required signaling to indicate the beginning and the end of a group and the reestablishment of the initial conditions, consist in marking the various selector positions in question by direct current potentials, and by linking up, by means of signaling wire, the selector to the apparatus storing the numerical indication in the register where each digit which may be received is characterized by the connection of a predetermined potential to the signaling wire. The magnitudes of the direct current potentials at the selector end are such that, among all the differences of potential to which the ends of the signaling wire may be subjected during the movement of the selector, only one predetermined difference is indicative of the wanted group. Thus the first part of the numerical selection problem resolves itself into the possibility of identifying that particular difference of potential. This is done by means of a detector arrangement inserted in the signaling wire, and so designed as to distinguish the predetermined difference of potential, or a higher difference of potential, from any lower difference which must not operate the detector. A circuit arrangement associated with the detector then allows the distinction to be made between the predetermined difference of potential which operates the detector and the higher differences of potential which also operate it. This is done by connecting the register end of the signaling wire after a first response of the detector to such a "check potential" that the difference to which the ends of the signaling wire are subjected after that first response becomes insufficient to cause a second response, if the difference of potential which caused the first response was precisely the predetermined value characterizing the beginning of the wanted group. However, if the difference is greater, then a second response of the detector takes place.

Thus, a first response of the detector which is not followed by a second response indicates that the correct position has been reached by the selector, and that free hunting may commence. A second response following the first response indicates that an unwanted group has been reached and that the effect of the first response must be cancelled. The second part of the numerical selection then consists in reestablishing the initial circuit conditions in the register controller at a suitable moment in order to repeat the selection process. This is effected by reversing the connection to the test detector after the second response, and by placing the register end at such a potential that a third response, causing the reestablishment of initial conditions, can only take place when the selector reaches a position marked by a suitable potential.

The selection of the tens in the final selector is similar to the group selection, the wanted tens subnormal positions having the same role as the position marking the beginning of the wanted group in the group selector. However, in the final selection stage the numerical selection is not followed by free hunting. The single response of the detector, therefore, merely indicates that the corresponding subnormal position has been reached, that the selector must for the time being be stopped, and that the units selection may be started, provided that the units digit has been received in the register. The end of a group need not, therefore, be marked.

The invention is illustrated in the following drawings: Fig. 1 shows the principles of operation, so does Fig. 2 in an alternative way, whereas

Figure 1:
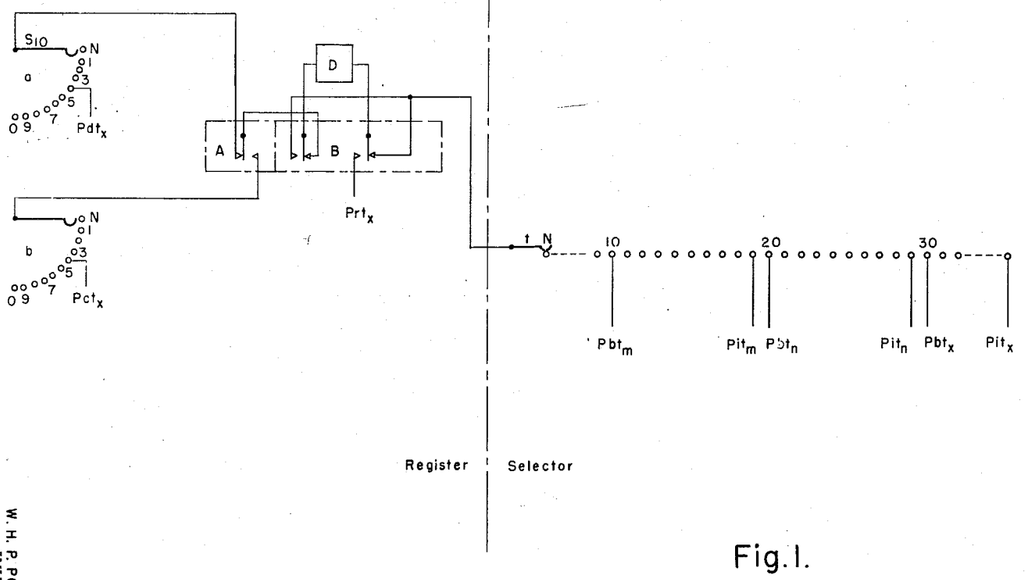

The principles of operation are illustrated in Fig. 1, where $S_{10}$ represents the switch on which the tens numerical indication is stored, only brush members $a$ and $b$ being shown. The selector brush over which the numerical selection is effected is designated by $t$, and D is the detector inserted in the signaling wire.

A and B represent respectively the contact groups which change the register circuit condition after a first and a second response of the detector, A being operated after a first response and A and B being operated after a second response.

$Pdt_x$ designates the potential characteristic of the tens numerical indication at the register end.

$Pct_x$ designates the corresponding check potential.

$Pbt_x$ designates the potential marking the wanted subnormal position in the selector.

$Prt_x$ designates the potential applied at the register to prepare the reestablishment of initial conditions.

$Pit_x$ represents the potential marking the selector position when initial conditions are to be reestablished after two successive responses of the detector.

The potentials which are lower than register potential $Pdt_x$ are similarly designated but indexed $n$, and those which are higher than $Pdt_x$ are indexed $m$.

If $V_0$ represents the minimum potential difference which, if it has the correct sign, will cause the response of the test detector, then the numerical selection will be effected correctly provided that the magnitudes of the various potentials fulfill the following relations:

A. (1) $Pbt_x - Pdt_x = V_0$
   (2) $Pbt_x - Pct_x < V_0$
B. (1) $Pbt_n - Pdt_x < V_0$
   (2) $Pit_n - Pdt_x < V_0$
C. (1) $Pbt_m - Pdt_x > V_0$
   (2) $Pbt_m - Pct_x \geq V_0$
   (3) $Prt_x - Pbt_m < V_0$
   (4) $Prt_x - Pit_m \geq V_0$
   (5) $Pit_m - Pdt_x < V_0$ Relations A fix the magnitude of the potentials relative to the numerical indication received in order to cause a single response of the detector, and thus stop the selector on the wanted tens subnormal or group position.

Relations B show that no selector potentials lower than $Pdt_x$ should operate the detector.

Relations C fix the magnitudes of the potentials relative to a numerical indication characterized by a potential higher than $Pdt_x$ and indicate that a first response caused by the difference $C_{(1)}$ is followed by a second response caused by $C_{(2)}$ and that after reversal of the connection to the detector the register and potential $Prt_x$ required to prepare the reestablishment of initial conditions cannot cause a premature third response with regard to the selector marking potential $Pbt_m$. When $C_{(1)}$ operates the detector, the selector is momentarily stopped and is again set in motion after the detector is operated by $C_{(2)}$. When the selector reaches the position marked by $Pit_m$ the difference $C_{(4)}$ causes the third response and the reestablishment of the initial conditions in the register. Relation $C_{(5)}$ shows that a premature first response in a new cycle of operation cannot take place when the register potential $Pdt_x$ is again applied to the signaling wire.

The above relations solve the tens selection problem, and require five different potentials $Pdt$, $Pct$, $Pbt$, $Prt$ and $Pit$. In the selector there are two positions for each numerical indication which may be received, and the potentials may be connected in any order. The number of different potentials and the number of selector positions required may be reduced by an adequate choice of the potential magnitudes and a suitable order of their succession in the selector arc. In particular, if we designate by $Pdt_x$, $Pdt_{x+1}$, $Pct_x$, $Pct_{x+1}$, etc., the various potentials in the increasing order of their magnitude, the number of different potentials required for ten different numerical indications will be reduced to thirteen if the various differences of potential $Pdt_{x+1} - Pdt_x$ are constant and equal, for instance, to $$\frac{V_e}{2}$$

and if $$Pct_{x+1} = Pdt_{x+2} = Pbt_x$$

The various potentials may then be taken off consecutive tappings of a potentiometer composed of equal resistances placed in series, or off consecutive cells of a battery each cell of which gives $$\frac{V_0}{2} \text{ volts}$$

A common value of the $Pit$ and $Prt$ potential may be taken and only one point is required in the selector bank for the connection of the $Pit$ potential if the marking potentials $Pbt$ are connected in the selector bank in a consecutive order of the magnitudes, and if the $Pit$ potential is different from $Pbt_1$.

A further advantage of connecting the selector marking potentials in the above-mentioned order is that the number of responses of the detector is reduced to a minimum.

It should also be noted that with the above choice and method of connection of the marking potentials it would be possible, by starting the selector from a home position, to eliminate conditions C since in that case the first potential which can operate the detector is the one which marks the wanted subnormal or subgroup position where the selector has to be stopped once, and for the tens selection. In case of a defective circuit operation, however, due for instance to a dirty contact on the wanted subnormal terminal, the selector might overshoot the wanted position. In that case a wrong selection would be effected since the condition $C_{(2)}$ which permits discrimination between the correct marking potential and a higher potential is not observed. The question of whether it is justifiable or not to adopt a system in which conditions A, B and C are respected, or one in which conditions A and B alone are taken into consideration depends, of course, on the probability of a fault, and its general influence on the telephone service, balanced against the circuit complications involved to neutralize the effect of the fault.

In the case of the tens selection of a two digit final selection, where a defective contact on one tens subnormal position is liable to affect $\frac{1}{10}$ of the traffic carried by the switch, it is fully justified to adopt the system where the complete check is made to identify the wanted position, means being provided for starting the selection over again in case of a wrong test, especially since the circuit components required already exist in the register for the purpose of insuring continuous hunting during group selection.

In the case of the units selection, however, the effect of a defective contact on a test terminal affects only calls to one subscriber's line, thus only 1/100 of the traffic carried by the switch. One would, therefore, be justified to adopt for the units the simplified numerical selection system previously referred to, provided that by doing so certain advantages be obtained and circuit complications avoided. This is the arrangement of the present final selector.

Figure 2:
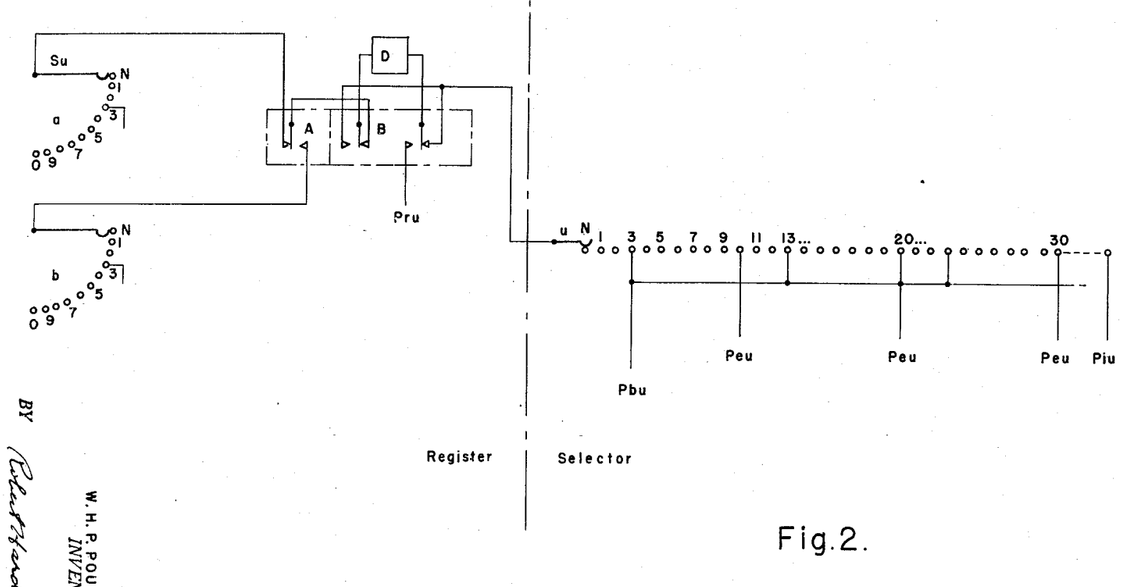

The units selection, which is also of the purely numerical type, and is effected by means of the same signalling principle as the tens selection, does not essentially differ from the latter, but presents the particularity that the marking for the units is repeated ten times in the selector bank, each set of units markings corresponding to one tens subnormal position. This is illustrated in Fig. 2, which is similar to Fig. 1, but the various potentials are represented by $Pdu$, $Pbu$, etc., instead of $Pdt$, $Pbt$, etc. If the complete selection system, with possible repetition of the test, were adopted, then the general relationship expressing the magnitudes of the potentials to be used would be similar to A, B and C for the tens selection. However, additional conditions must exist to indicate that the end of the set of units markings corresponding to the wanted tens group has been reached, and that the selection process must be interrupted until the selector again reaches the wanted tens subnormal position after having effected a complete rotation.

The relationships governing the magnitudes of the potentials for the units selection would be:

D. (1) $Pbu_x - Pdu_x = V_0$
 (2) $Pbu_x - Pcu_x < V_0$
 (3) $Peu - Pcu_x \geq V_0$
 (4) $Pru - Peu < V_0$
 (5) $Pru - Piu \geq V_0$
 (6) $Piu - Pdu_x < V_0$ E. (1) $Pbu_n - Pdu_x < V_0$ F. (1) $Pbu_m - Pdu_x > V_0$
 (2) $Pbu_m - Pcu_x > V_0$
 (3) $Pru - Pbu_m < V_0$
 (4) $Pru - Peu > V_0$
 (5) $Pru - Piu \geq V_0$
 (6) $Piu - Pdu < V_0$ $Peu$ represents the potential used to indicate that the end of the required set of units markings has been reached. The potentials $Peu$, $Pru$ and $Piu$ are not indexed because they do not refer to a particular units numerical indication received, but are relative to one complete set of units markings.

There are two examples of the manner in which the $Peu$, $Piu$ and $Pru$ potentials may be chosen:

(a) A common value may, for instance, be taken for $Peu$ in order to satisfy relations D3 and D4, but potentials $Pru$ and $Piu$ must each have values characterized by the tens numerical indication received in order to cause the reintroduction of initial conditions for the units selection at the correct moment, that is, at the moment or just before the tens subnormal position is again reached (not shown in Fig. 2).

(b) Another means of insuring the units selection would be to take common values for $Peu$, $Pru$ and $Piu$, but in that case the third response of the detector should cause the reintroduction of initial conditions existing before the tens selection and allow both selections to recommence (shown in Fig. 2). Relations D6 (and F6) should then be changed to $$Piu - Pdt_x < V_0$$

The above solutions entail additional circuit complications in the register. Furthermore, solution (a) demands two extra terminals per units markings in order to indicate the end of the set and the beginning of the set for reintroducing initial conditions for the units selection. Solution (b) has the advantage of requiring only one position for marking the end of the set of terminals, the position for connecting the $Piu$ need appear only once in the selector arc since it causes the reintroduction of conditions existing before the tens selection.

In the above examples it is understood that the tens and units selections are made via different selector brushes, and that no particular relationship exists between the tens and units series of potentials. Such solutions have the serious disadvantage that a change has to take place between the tens and units selections in order to switch over the signaling wire from one brush to the other, whereby the final selector circuit becomes complicated. This complication can be avoided by effecting the tens and units selection via the same brush of the selector. However, this requires a relationship between the various potentials used for each of the two selections.

Although correct tens selection $Pbt_x - Pdt_x$ must be $=V_0$, while the difference between any other potential connected in the selector arc and $Pdt_x$ must be different from $V_0$ the number of unnecessary responses of the detector will become excessive if the units marking potentials may operate the detector at potential $Pdt$. Also, the number of terminals required for reestablishing the initial conditions and, therefore, lost for line capacity, would be prohibitively large. Thus a first condition to be observed when combining the two selections is, that units marking potentials connected in the selector bank must not operate the detector with the tens register potentials or:

$$Pbu_{max} - Pdt_{min} < V_0$$

and since $$Pbt_{min} - Pdt_{min} = V_0$$
$$(X)\ Pbu_{max} < Pbt_{min}$$

A second point to be taken into consideration is, that at the moment the units selection is started and the register end of the signaling wire is placed at a potential $Pdu_x$, the selector end potential $Pbt$ still connected to the signaling wire, until the selector has had time to move, must not cause premature response of the detector, or $$Pbt_{min} - Pdu_{max} < V_0$$

and since $$Pbu_{max} - Pdu_{max} = V_0$$
$$(Y)\ Pbt_{min} < Pbu_{max}$$

Conditions (X) and (Y) need not exist simultaneously since (X) refers to the tens selection and (Y) to the units selection. The apparent contradiction between conditions (X) and (Y) can then be removed by crossing the connections to the detector between the tens and units selections, in which case the above relations for the units selection become $$Pbt_{min} - Pdu_{max} < -V_0$$

and thus $$Pbu_{max} < Pbt_{min}$$

which is in accordance with the conditions required for the tens selection. Care has to be taken, however, that during the reversal of the connections to the test detector on a repetition of the tens selection no interference is caused by the units marking potentials, and for that reason the following conditions must also be observed:

$$Prt - Pbu_{min} > V_0$$

Since on the other hand $$Prt - Pit > V_0$$
$$(Z)\ Pit < Pbu_{min}$$

If the connections to the detector must be crossed between the tens and units selections in order to prevent interference, then the reversal feature cannot be employed to eliminate faulty operation, and to insure repetition of the test in the units selection. It is thus necessary to adopt for the latter the simplified system which consists in connecting in the selector bank the marking potentials in the consecutive order of their magnitudes, so that during the units selection the first units potential encountered capable of causing the response of the detector, corresponds to the wanted line. As we have already seen, the latter method is justified in the case of units selection.

In order to avoid any unnecessary loss of positions in the selector bank, the tens subnormal position should also correspond to a subscriber's line. This position cannot be marked by a units marking potential, and demands therefore a special selection operation, not included in the general method above described. It can be insured by causing an artificial response of the detector without moving the selector when the units digit of the subscriber's number corresponding to the tens subnormal position is received in the register. Although, in theory, any units digit may be chosen to designate the called subscriber's line preferably C is used to permit consecutive numbering of the lines in the selector bank, and to reduce the selection time.

Figure 3:
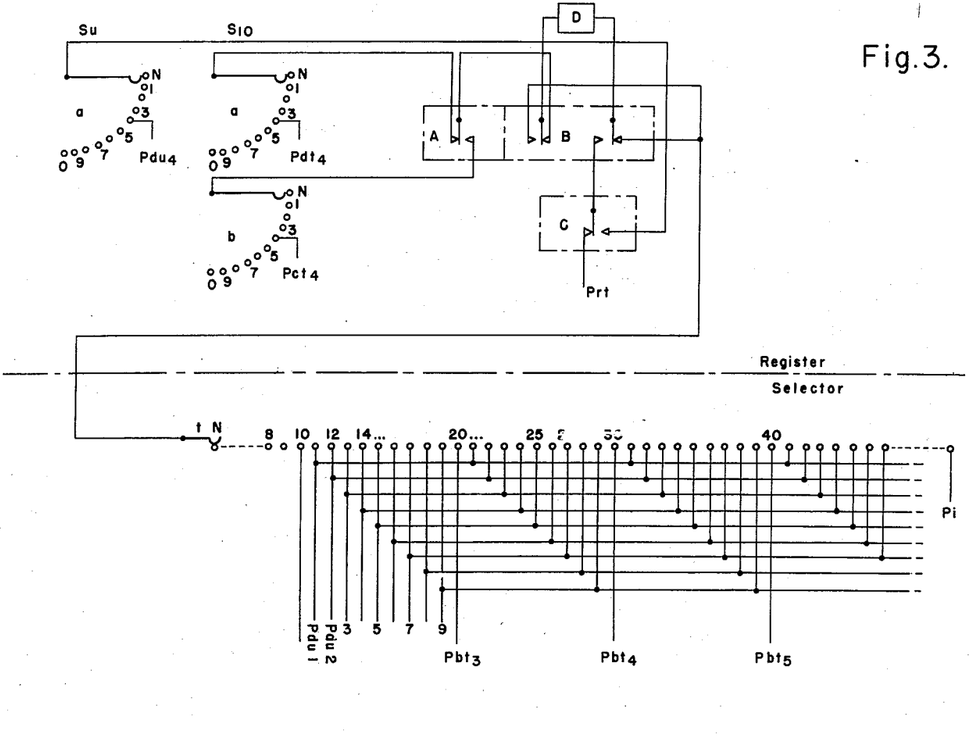
Fig. 3 shows the principles of the tens and units selection via the same brush member and terminal bank of the final selector.

Fig. 3 shows the principle of operation of the final selection where the tens and units selections are effected via a same brush and terminal bank of the selector.

During tens selection the A and B group of contacts play their part as already described, until the wanted tens subnormal position is reached, when contact group A alone is operated after a single response of the detector. The conditions required for the units selection are then introduced in the register by causing contact group B to operate, as well as contact group C, which switches the required side of the tests detector from the P$rt$ potential to the characteristic potential P$du$ corresponding to the units digit received on switch S$u$.

The general conditions governing the magnitudes of the potentials to be adopted are then:

For the tens selection: A, B, and C as already stated.
For the units selection:
    D. (1) $Pbu_x - Pdu_x = V_0$
       (2) $Pbu_1 > Pbu_2 > Pbu_3$, etc.

and for relating the units and tens potentials to one another:

(X) $Pbu_{max} < Pbt_{min}$
    (Z) $Pit < Pbu_{min}$ A suitable choice of the potential magnitudes and the order of connection of the potentials in the selector arc permits selection by means of twenty different potentials and 101 terminals for 100 subscriber lines as will be made clear from the practical example given below.

The "chasing" feature which consists in allowing the selector to start the selection by moving from a home position before the end of the reception of the digit in the register can also be introduced in conjunction with the tens selection in the manner explained for the group selection in U. S. application Serial No. 728,548, filed February 14, 1947.

The simplified method of units selection described previously, allows the introduction of the group hunting feature without any circuit complications. In the case of the units selection an open marking wire corresponding to the wanted line will automatically cause the next line to be selected if the potential marking the next line can operate the detector. If, therefore, the marking wire of a line is controlled via a break contact of the cut-off relay of that line, then the line will form part of the group over which free hunting takes place. The group will comprise all lines having a controlled marking potential up to and including the first line marked by a non-controlled potential capable of operating the detector with the potential characterizing the units digit of the first line of the group.

In Fig. 3 the lines corresponding to terminals 25, 26 and 27 form a group, the marking wires 25 and 26 being controlled.

The above considerations will be best understood by a practical example illustrated in Figs. 4 and 5 and explained in the following detailed description:

APPARATUS FUNCTIONS

Figure 4:
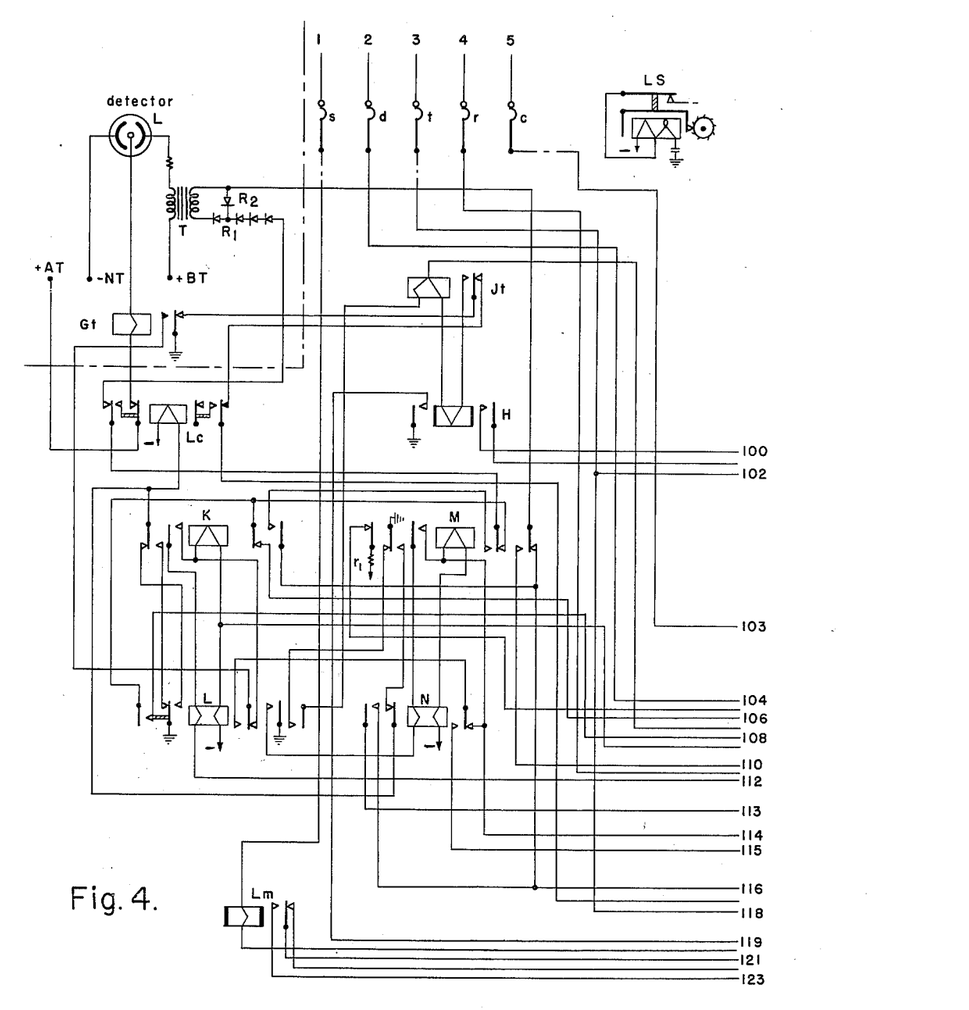
Figs. 4 and 4a show the important parts of the register circuit and Figs. 5 and 5a represent the final selector circuit with parts of the link circuit.
Figure 4A:
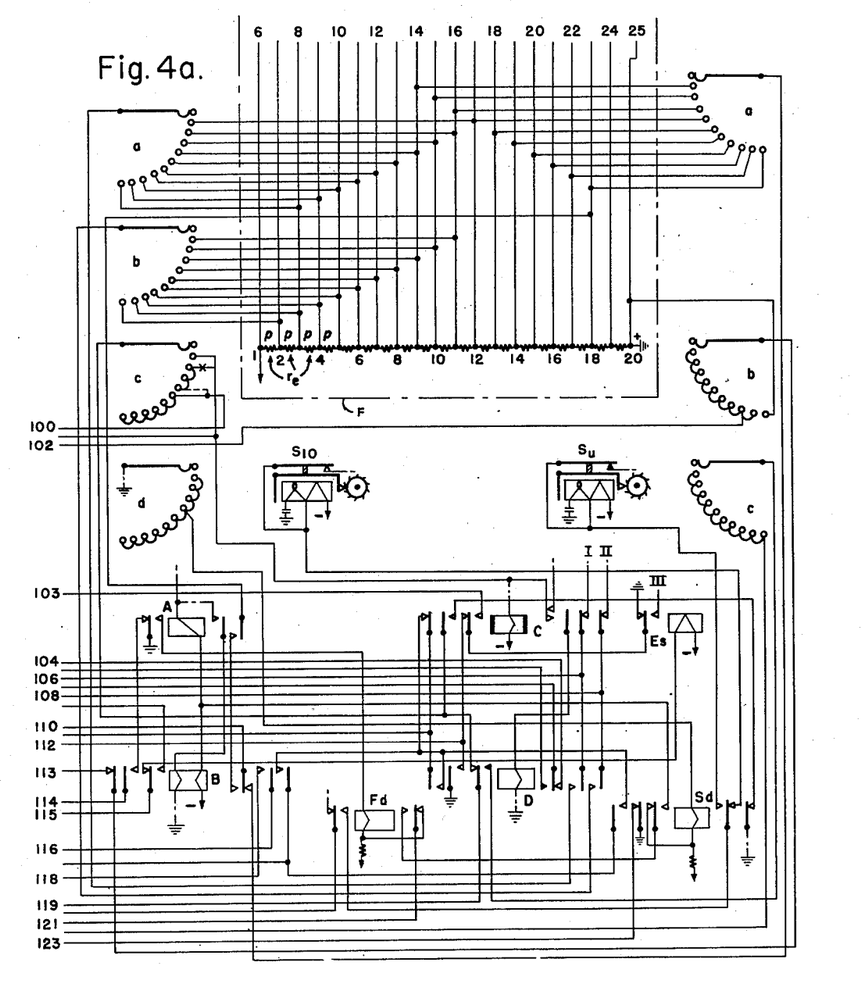

In Figs. 4 and 4a:

LS represents the power magnet of the link chooser of which brush members $s$, $d$, $t$, $r$, and $c$ are shown. The dial impulses received by the link stepping relay are transmitted to the register over brush $s$. The signaling for numerical selection is effected over brush $t$, the test for a free final in the required group is effected over brush $d$, the control of the power magnet of the selector is made over brush $r$, and the seizure of the selected outlet is made over brush $c$.

S$_{10}$ represents the power magnet of the digit receiving switch on which the tens digit is stored. Four arcs and corresponding brush members $a$, $b$, $c$, and $d$ of the switch are shown.

S$u$ represents the power magnet of the digit receiving switch on which the units digit is stored, and corresponding members $a$, $b$ and $c$ of the switch are shown.

A, B are two relays which have been operated during the reception of the digit preceding the tens digit and the release of which indicates the starting of the units selection.

F$d$ is a relay which energizes at the end of reception of the hundreds digit and switches over the stepping circuit from the hundreds digit receiving switch, not shown in the drawing, to the tens digit receiving switch.

C, D and S$d$ are three relays used in the reception of the tens digit, the operation of relay C indicating the beginning of the reception of the digit, the operation of relay D indicating when the selector may start rotating for the tens selection, and the operation of relay S$d$, indicating the end of reception of the tens digit.

L$m$ is a slow relay energizing in series with the power magnet of the digit receiving switch and which remains energized until the end of reception of the train of impulses.

K and L are two relays indicating the first response of the test detector during the corresponding selection.

M and N are relays which operate during the tens selection and indicate the second response of the test detector in case the selector first stops on a wrong test potential or overshoots and passes over a further test potential. After the tens selection has been completed, this second response reestablishes the conditions for the units selection.

LC is a relay controlling the anode circuit of the test detector cold cathode tube, the primary circuit of the test detector transformer and the circuit for controlling the rotation of the selector. Its functions are: to extinguish the cold cathode tube after each response of the detector and to prevent the primary circuit of the surge coil from being closed before the anode circuit is reclosed.

JT and H are a test and helping relay for direct current test during the free hunting of preceding group selections. They are used again during the final selection for checking the busy or free state of the selected line.

Es is a relay to indicate that the units selection is finished, i. e. that the final selector has been set on the terminals of the wanted line.

F is the common potentiometer for providing the series of potentials characterizing the digits received in the register and the tens and units stopping positions of the selector.

The test detector is similar to that described in U. S. Patent No. 2,444,065 and comprises the cold cathode tube L with biased control electrode, a surge transformer T with associated rectifiers $R_1$, $R_2$, and an anode relay Gt. The three terminals marked AT, NT and Bt show, respectively, where the anode potential, the cathode potential, and bias potential are connected.

Figure 5:
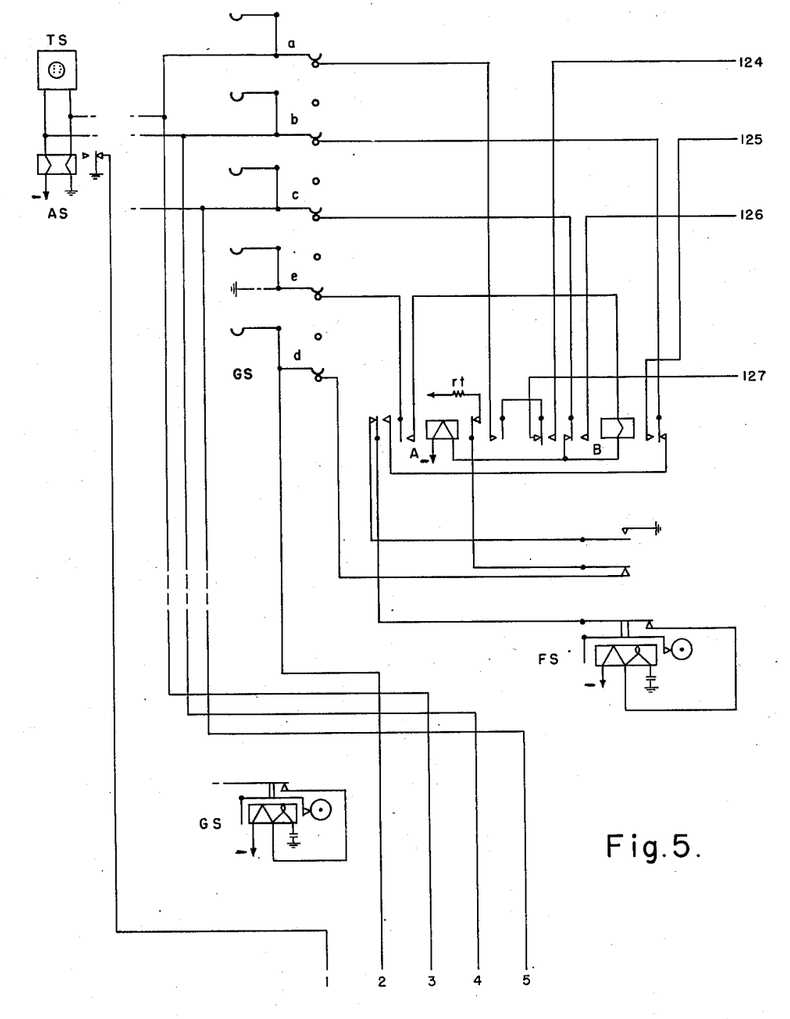
Figure 5A:
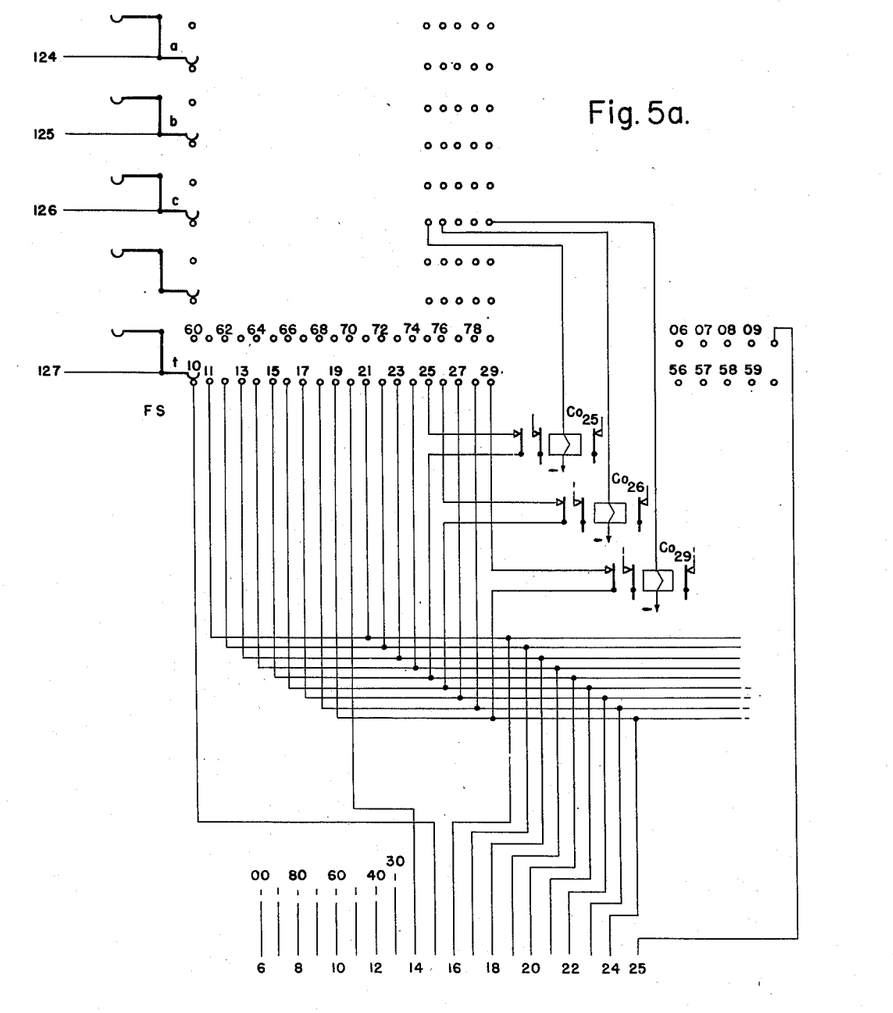

In Figs. 5 and 5a:

TS represents the calling subscriber's telephone set.

AS is the combined supervisory and stepping relay to which the calling subscriber's set is connected over a line finder, and various groups of relay contacts in the link circuit not represented in the drawing as they have no direct bearing on the selection.

GS is the power magnet of the group selector whose brush members $a$, $b$, $c$, $d$ and $e$ are shown over which the final selection is controlled from the register.

A is a relay which energizes at the moment the final selector is seized and introduces in the final selector the conditions necessary to effect the tens and units selection.

B is a relay which indicates that the selector has been set to the terminals of the wanted line and introduces in the final selector the conditions existing during conversion.

FS is the power magnet of the final selector whose brush members $a$, $b$, $c$, and $t$ are shown

RECEPTION OF THE TENS DIGIT

At the end of reception of the hundreds digit, relays A, B and Fd are energized and relay Fd prepares the circuit for the reception of the tens digit. The impulse train corresponding to the tens digit thus causes digit switch $S_{10}$ to take a number of steps corresponding to the number of impulses of the train, the following circuit being closed every time relay As releases during dialing (Fig. 4):

(1) Battery, winding of switch $S_{10}$, right inner break contact of relay Sd, left make contact of relay Fd, winding of relay Lm, brush and terminal s of link chooser switch LS, break contact of relay As, to ground.

Relay Lm energizes during the first impulse and remains operated until the end of the train of impulses.

When the digit receiving switch is out of its normal position, provided relay H has operated indicating that the preceding selection is finished and that an outlet to a final has been found, one of the following circuits is closed for the energization of relay C:

(2) (a) Battery, winding of relay C, first portion of arc c and brush c of switch $S_{10}$, left inner break contact of relay D, left make contact of relay H, to ground.

(b) Battery, winding of relay C, right make contact of relay H, brush and second portion of arc c of switch $S_{10}$, left inner break contact of relay D, left make contact of relay H, to ground.

When relay C is energized a circuit is prepared for the operation of relay D in series with C, but relay D cannot energize as long as the operating ground for relay C remains connected to the winding of the latter, relay D being then short circuited. The energization of relay C introduces the following conditions in the register circuit:

(a) The circuits connecting the detector to the potential characterizing the hundreds digit received and the corresponding check potential, which were applied via leads I and II towards the hundreds digit receiving switch (not shown in the drawing), are opened at right hand break contacts of relay C.

(b) The circuit for rotating the selector during the group selection corresponding to the hundreds digit is opened at the left outer break contact of relay C.

(c) The locking ground for relays K and L which operate during the hundreds selection is opened at the left inner break contact of relay C; relays K and L, and consequently relays M and N are de-energized thus introducing the initial conditions required before a numerical selection.

(d) Relay C prepares the circuit for the energization of relay Sd, but this relay remains short circuited as long as relay Lm is energized, that is, until the end of reception of the tens digit:

(3) Ground, brush and arc d of switch $S_{10}$, winding of relay Sd, left inner break contact of relay Sd, right make contact of relay Fd, make contact of relay Lm, left middle break contact of relay Sd, to ground.

(e) Via its left inner make contact relay C connects ground towards brush c of Ls in order to seize the final selector which has been chosen during the hundreds selection.

The circuit for seizing the final selector may be traced as follows:

(4) Battery, winding of relay A of Fig. 5 in the final selector, left inner break contact of relay B, in the final selector, terminal and brush c of the preceding group selector, terminal and brush c of the link chooser LS, left inner make contact of relay C (Fig. 4a), break contact of relay E, to ground.

When relay A is energized in the final selector circuit, the test potential which was connected via terminal and brush d of the group selector and link chooser to the test relay Jt and helping relay H is removed, thus indicating in the register that the final selector is seized. The release of relay H in the register removes the short circuit on relay D as traced in circuits (2a) or (2b). As long, however, as the digit receiving switch $S_{10}$ is in such a position that circuit (2a) is closed, relay D still remains short-circuited over a break contact of relay Sd as follows:

(5) Ground, winding of relay D, right inner make contact of relay C, first portion of arc c and brush c of switch $S_{10}$, left middle make contact of relay C, right outer break contact of relay Sd, to ground.

Thus, if the digit received is such that switch S10 does not step beyond the first portion of arc c where the terminals are strapped together, then relay D does not energize until relay Sd has operated and relay H released, that is, until the digit has been completely received and until the wanted final selector has been seized. If, however, the digit received is such that S10 moves brush c into the second portion of arc c, then relay D can energize before the end of the reception of the digit, the operating circuit (2b) for relay C being opened and the short circuit on relay D being also opened. In the latter case, therefore, only the release of relay H in the register is necessary to permit operation of relay D.

The operation of relay D indicates that selection may start, and this relay has the necessary contacts for closing the rotary circuit of the selector and for connecting the signaling wire over which the tens numerical selection is controlled to the characteristic potential and check potential of the tens digit received.

SELECTION

Chasing

Selection begins when the final selector FS starts rotating as soon as relay D energizes. In order to prevent the group selector from catching up with the digit receiving switch S10, in case the hundreds selection is finished before the tens digit is sent in the register, the rotation of the selector must be delayed with respect to the beginning of the reception of the impulse train. This delay is insured by strapping together the required number of terminals on arc c of S10, thus maintaining circuit (2a) closed for a sufficient length of time. The delay required between the beginning of reception and the beginning of selection depends on the speeds of both the selector and the digit-receiving switch. Let us assume that the digit receiving switch may advance at a minimum speed of 8 steps per second (minimum dial speed), then the selector may have a maximum rotation speed of 80 steps per second. Assuming also that each tens position is separated from the next one by the 9 positions corresponding to the units digits 1-9, then it is sufficient to delay the operation of relay D during the first impulse of the train by separating the first terminal of arc c of S10 from the others (alternatively shown by dotted strap and cross), since one step of the digit receiving switch is equivalent in time to ten steps of the selector.

When relay D energizes in series with relay C the following circuit is closed for rotating the selector:

(6) Battery, winding of Fs, interrupter of Fs, left middle make contact of A (Fig. 5), right inner break contact of B (Fig. 5), brush and terminal b of the group selector, brush and terminal r of switch LS (Fig. 4), left outer make contact of relay D, right outer make contact of relay B, right break contact of relay Lc, break contact of relay Jt, break contact of relay Gt, to ground.

At the same time the test circuit is prepared as follows:

(7) Arc and brush a of switch S10, right middle make contact of relay D, right break contact of relay K, right inner break contact of relays M, left outer break contact of relay Lc, rectifier R1 and primary winding of transformer T, right outer break contact of relay M, right middle make contact of relay B, brush and terminal t of switch Ls, brush and terminal a of the group selector (Fig. 5), right make contact of relay A in the final selector, left outer break contact of relay B in the final selector and brush t of the final selector switch.

As long as the digit has not been completely received, the detector will not respond owing to the delay which has been introduced before starting the final selector. When, however, at the end of the reception of the digit, a switch S10 definitely occupies the position characteristic of the digit received, then the test circuit will be completed.

In the example shown in the drawing, the different potentials required for the digits received in the register and the corresponding stopping positions of the selector are obtained from a potentiometer, the number of resistances being such that the voltage drop $p$ across a resistance unit is smaller than the minimum difference of potential required to operate the test detector, but the voltage drop $2p$ across two consecutive resistances corresponds to the minimum difference of potential required. The connection of the primary circuit and associated surge coil is such, that the potential to which the brush of the selector is subjected must be negative with respect to the potential to which brush a of switch S10 is connected. Terminal 1 of arc a is connected to point 12 of the potentiometer, terminal 2 to point 11, terminal 3 to point 10, and so on, whereas subnormal position 10 of the final selector is connected to point 10, subnormal position 20 to point 9, subnormal position 30 to point 8, and so on. There exists thus, between the terminal on arc a corresponding to a given tens digit and the subnormal position on the selector corresponding to the same tens digit, a difference of potential of $2p$ volts.

If, for instance, tens digit 2 has been received in the register and that switch S10 is standing in position 2, brush a of S10 is connected to point 11 of the potentiometer and subnormal position 20 of the selector is connected to point 9 of the potentiometer.

Normal test

When the selector reaches the subnormal position 20, the detector operates in circuit (7) and the anode relay Gt energizes. Gt removes, at its break contact, the ground for rotating the selector in circuit (6) and via its make contact closes a circuit for the energization of relay K (Fig. 4):

(8) Battery, right hand winding of relay L, winding of relay K, right inner break contact of relay L, make contact of relay Gt to ground.

Relay K energizes and prepares its holding circuit in series with the left hand winding of relay L. Relay L, however, does not yet energize, the current received through its right hand winding alone being insufficient. Relay K closes in its make contact a circuit for the energization of relay Lc, which opens the anode circuit of the cold cathode tube, the primary circuit of the surge coil, and the circuit rotating the selector. Relay Gt de-energizes and by opening circuit (8) causes relay L to operate in series with relay K which thus remains held. As soon as relay L is energized, that side of the primary circuit of the surge coil which was previously connected to brush a of switch S10 is now switched over to brush b via a left outer make contact of relay L and the right outer make contact of relay D.

The terminals of arc *b* are each connected to a point of potentiometer whose potential is *p* volts less than the corresponding terminal on arc *a*. Thus, terminal 2 of arc *b* is connected to point 18 of the potentiometer. Furthermore, at the moment relay L opened its left break contact relay Lc de-energized thus reclosing the anode circuit for the cold cathode tube and the primary circuit for the surge coil. The circuit for rotating the selector remains open, the test relay Jt and helping relay H energizing when relay L closes its right outer contact:

(9) Battery, resistance $r_1$ which has the same value as the resistance $rt$ in the selector, left outer break contact of relay M, right inner make contact of relay D, winding of relay Jt, right outer make contact of L, middle break contact of relay M, to ground.

Relay Jt thus energizes causing, in turn, energization of relay H if circuit (9) remains closed for a sufficient length of time. The sequence of the contacts of relay Lc insures that the primary circuit of the surge transformer is closed only after the anode circuit of the cold cathode tube is reclosed and so guards the detector against a surge before the cold cathode tube is ready for it.

We have assumed that the detector has responded when the subnormal position 20 was encountered by the selector FS, this being the correct subnormal position corresponding to digit 2 received in the register. When relay Lc recloses the anode circuit of the cold cathode tube, the primary circuit of the surge transformer, and the circuit for rotating the selector, the difference of potential applied to the detector is *p* instead of 2*p* volts. Although this difference has the required direction to operate the detector, it is below the minimum difference required and the detector does not respond a second time. Relays M and N thus remain de-energized and the helping relay H of the test relay has time to close its make contacts, circuit (9) remaining closed.

The energization of relay H at this stage of the selection indicates that the tens selection is completed.

*False test*

If we assume, as previously, that digit 2 is the tens digit received but that, e. g. because of a dirty contact the selector has failed to operate the detector when subnormal position 20 was encountered, then the selector will go on rotating until subnormal position 30 is reached. The primary circuit of the test transformer is then subjected to a difference of potential of the correct polarity and exceeding the minimum required for operation, operating the detector. Relay Gt energizes and operates relays K and L, whereupon relay Lc functions as explained previously.

When relays K and L are both energized after a first response of the detector, the primary circuit of the surge transformer is reconnected between the selector brush *t* and the brush *b* of the digit receiving switch $S_{10}$.

The detector first responded to a difference of potential of 3*p*. It is now subjected to a difference of potential 2*p* and, therefore, responds again; relay Gt re-energizes and causes relay M to energize in a manner similar to relay K. As soon as relay M is energized, the side of the surge coil previously connected to brush *b* of the digit switch $S_{10}$ is connected to brush *t* of the selector, and the side previously connected to the selector is connected to point 18 of the potentiometer over the following path:

(10) Point 18 of potentiometer, right outer make contact of relay A (Fig. 4a), right inner make contact of relay B, right outer contact of relay M, winding transformer T, rectifier $R_1$, left outer break contact of relay Lc, right inner make contact of relay M, right outer contact of relay K, right middle make contact of relay B, brush and terminal *t* of LS, brush and terminal *a* of group selector GS, right outer make contact of relay A in the final selector (Fig. 5), left outer break contact of this relay, left outer break contact of relay B (Fig. 5), brush *t* of Fs.

While relay M is energized, the circuit for the operation of relay Lc is reclosed and the latter extinguishes the cold cathode tube and causes the release of relay Gt. Relay N then energizes in series with relay M just as relay L energized in series with relay K during the first operation of relay Gt. Relay Lc is released and the detector is again switched in. From the moment relay M energizes, circuit (9) for the energization of relays Jt and H is opened before relay H has had time to close its make contact after the first response of the detector. The circuit for rotating the selector is thus reclosed.

Selector FS now passes over all except the last terminal in the arc without any of the potentials connected to bank *t* having any effect on the detector owing to the reversal of the connections to the latter. When, however, the selector reaches the last position in the arc where the *t* terminal is connected to point 20 of the potentiometer, the primary circuit of the surge coil is subjected to a difference of potential of 2*p* volts in the correct direction to operate the detector. Relay Gt again energizes thus momentarily stopping the selector and relay K is short-circuited as follows (Fig. 4):

(11) Ground, left middle make contact of relay D, left hand winding of relay K, left inner make contact of relay B, right make contact of relay N, right inner make contact of relay L, make contact of relay Gt, ground.

Relay K de-energizes but relays L, M and N remain energized. When relay L is operated and relay K is de-energized, a circuit is again closed for energizing relay Lc and the cold cathode tube of the detector is extinguished. Relay Gt de-energizes and removes the energizing ground for relay L. Relay L releases opening, in turn, the holding ground for relays M and N which also de-energize. The conditions existing before the tens selection are thus reestablished in the register and the selector will continue to rotate until the detector responds when the subnormal position 20 is encountered.

*Reception of units digit*

As we have seen for the reception of the tens digit, relay Sd energized when relay M released at the end of reception of the tens digit impulse train. The digit-receiving switch Su becomes connected to the stepping contact of relay As controlled by the subscriber's loop:

(12) Battery, winding units switch Su, right inner make contact of relay Sd, left make contact of relay Fd, winding of relay Lm, brush and terminal *s* of switch LS, all in Figs. 4 and 4a, break contact of relay As (Fig. 5) to ground.

Su thus makes a number of steps equivalent to the number of units impulses, and relay Lm energizes during the first impulse and remains up until the end of reception.

When the impulse train is ended and relay Lm recloses its break contact, conditions are introduced in the register enabling the units selection to be started when relay H energizes and indicates that the tens selection is finished.

*Units selection (units digit other than 0)*

When the units digit has been received and relay H has energized indicating that the tens selection is ended, the following short circuit is closed for the release of relay A:

(13) Ground, left hand winding of relay B (Fig. 4a), right inner make contact of relay A, winding of relay Sd, right make contact of relay Fs, break contact of relay Lm, arc and brush c of switch Su, inner left make contact of relay D, left inner make contact of relay H, to ground.

Relay A de-energizes but relay B remains held over its right hand winding via the same ground which short circuits relay A. When relay A is de-energized and relay B is operated, a circuit is closed for the energization of relay M (Fig. 4):

(14) Battery, right hand winding of relay N, winding of relay M, left middle make contact of relay B, left break contact of relay A to ground.

Relay M energizes and prepares its holding circuit in series with the left hand winding of relay N which, however, does not energize before the operating ground for relay M is removed. When relay M is operated, the battery which held relays Jt and H energized at the end of the tens selection is removed at the left outer break contact of M. Relays Jt and H de-energize and the last-mentioned relay, by opening the short circuit ground on relay A, causes the de-energization of relay B. By opening its left middle make contact relay B removes the operating ground for relay M and the latter remains held in series with relay N which energizes.

While relay M was operated and relay N de-energized, relay Lc was again operated thus maintaining open at its right break contact the circuit for rotating the selector which, otherwise, would have been reclosed owing to the release of relay Jt. However, as soon as relay N is energized, relay Lc releases and the selector is set in motion. Relays K, L, M and N being energized, the connections to the primary circuit of the surge coil are reversed and, furthermore, relays A and B being de-energized, the signaling circuit is connected to brush a of switch Su as follows:

(15) Brush a of switch Su, right inner break contact of relay B, right outer make contact of relay M, primary of the surge coil T, rectifier R1, left outer break contact Lc, right inner make contact of relay N, right outer make contact relay K, left make contact relay N, left outer break contact relay B, brush and arc b of switch Su, terminal t of Ls towards brush t of the final selector FS (Fig. 5a).

It must be pointed out that, although relay B is de-energized and the original circuit for rotating the selector is opened at its right outer make contact, a second circuit for rotating the selector is closed over the left outer make contact of relays Sd which doubles the right outer make contact of relay B.

The various potentials used to characterize the units digit and the corresponding stopping positions of the final selector are chosen as follows:

Position 1 in arc a of Su is connected to point 9 of the potentiometer, position 2 to point 10, position 3 to point 11, and so on up to position 10 which is connected to point 18.

In bank t of the final selector FS the first terminal following the subnormal position selected during the tens selection and corresponding to units digit 1 is connected to point 11 of the potentiometer, the next terminal is connected to point 12, and so on up to the ninth terminal which is connected to point 19 of the potentiometer. Thus, for any of the digits 1–9 the detector will be subjected to a difference of potential of $2p$ volts in the correct direction to operate it when the final selector encounters the t terminal of the line corresponding to the units digit received in the register.

If we assume, for instance, that units digit 4 has been sent in and that the called line is No. 24 in the hundreds group to which the final selector gives access, then the selector having started again its rotation from the subnormal position 20, will continue until position 24 is reached and the detector again responds. Relay Gt then energizes stopping the rotation of the selector and closing the following circuit for the energization of relay Es (Fig. 4a):

(16) Battery, winding of Es, left inner break contact of relay D, right make contact of relay N, right inner make contact of relay L, make contact of Gt, to ground.

Relay Es, when energized, removes at its break contact the ground which was given for seizing the final selector over terminal and brush c of the group selector GS and link chooser LS and thus causes the energization of relay B in the final selector by the removal of the short circuit ground on the latter relay. Relays A and B now remain held in series as follows:

(17) Battery, winding of relay A, winding of relay B, left inner make contact of relay A, brush and terminal c of GS, to a busy ground in the link circuit.

When relay B is energized in the final selector, the a, b and c wires from the group selector are through-connected to the corresponding brushes of the final selector. In the register, relay Es connects the c wire towards lead No. 3 over which the final busy or free check of the line is made prior to the release of the register.

*Units selection (digit 0)*

In order to avoid losing positions in the selector bank, the subnormal positions for the tens selection are used also for giving access to a line. The arrangement is such that, if units digit 0 is dialed, the final selector remains on the subnormal position corresponding to the tens selection to which the line having 0 as units digit is connected.

When digit 0 is received as units digit in the register, the detector is operated in a local circuit independently of the position of the final selector, and as soon as relays K, L, M and N are energized and relays A and B released. This circuit may be traced as follows:

(18) Point 20 of the potentiometer, arc and brush b of switch Su in position 10, left outer break contact of relay B (Fig. 4a), left make contact of M, right make contact of relay K, right inner make contact of relay M, left outer break contact of relay Lc, rectifier R1, primary of transformer T, right outer make contact of relay M, right inner break contact of relay B, brush and terminal 10 of arc a of Su to point 18 of the potentiometer.

The detector is thus subjected to the required difference of $2p$ volts in the correct direction to operate it. Relay $Gt$ then energizes and in turn operates relay $Es$ indicating the end of selection without having caused the final selector to move from the subnormal position reached during the tens selections.

*Group hunting*

The principle of group or P. B. X has already been explained in the first part of the present description. Fig. 5a shows how the units marking wires of the lines Nos. 25 and 26 are controlled via break contacts of the cut-off relays Co of these lines, thus forming a group comprising lines 25, 26 and 27. The marking wire of line No. 29 is similarly controlled, thus forming a second group comprising lines 29 and 30.

The above describes by way of example an embodiment of the invention. Obviously, alternative solutions are possible, all based on the principles of the invention which is not limited to the details here disclosed.

What is claimed is:

1. In a telecommunication system, a plurality of lines, means including a final selector for connecting a calling with a called line, said selector having a bank of terminal sets in which the lines terminate, a set of wipers, and means for moving said wipers over the terminals, a register comprising a digit switch having a first and a second group of contacts selectable depending on the tens digit called, means controlled by the calling line for operating the register to receive and store the digit of the called number, a plurality of different sources of direct current potential connected with terminals in said bank and with the register, a different source being connected to each contact of the first and second groups of said register; the terminal bank of the selector being divided into groups of ten terminals, corresponding nine terminals of each group being multiplied together and connected to nine different ones of said potential sources and each tenth terminal being connected to still a different one of said sources, a signalling wire extending from the final selector to the digit switch in the register, a detector comprising a gas valve and a transformer, the gas valve being connected to the primary winding of the transformer and the secondary winding thereof being connected with said signalling wire, a source of potential local to the register, means responsive to the tens and the units digit received for connecting the register end of the signalling wire over said digit switch to one of said predetermined sources connected to contacts of said digit switch, means controlled by the register after the receipt of each digit for starting the selector, said selector connecting the selector end of the signalling wire to various sources marking the terminals thereof, said gas valve being adjusted to respond to a predetermined difference of potential applied to the ends of the signalling wire during the tens and also during the units selecting movements of the selector for operating said detector, means operative upon each operation of the selector for stopping the selector, and means in the register for connecting the detector in three alternative connections: between the first contact group of the digit switch and a wiper of the selector, between the second contact group of the digit switch and a wiper of the selector, and between the second contact group of the digit switch and said source of potential local to the register.

2. The system according to claim 1 in which there are ten contacts in the first and second groups of contacts of the digit switch and cooperating first and second brushes and in which the means for connecting the detector in three alternative connections connects between the first brush of the digit switch and a wiper of the selector, between the second brush of the digit switch and a wiper of the selector, and between the second brush of the digit switch and the source of potential local to the register.

3. The system according to claim 1 in which the register comprises a tens digit switch and a units digit switch, each having a group of contacts, and a group of test contacts for the tens digit switch, and in which the different source of potential is connected to corresponding contacts of each group, the terminal bank of the selector being divided into groups of ten terminals, nine terminals of each group being multiplied to corresponding terminals of the other groups and connected to nine different sources and each tenth terminal being connected to a different source, and the means in the register for connecting the detector is arranged to connect it in four alternative connections: between the first contact group of the tens digit switch and the test wiper of the selector, between the test contact group of the tens digit switch and the test wiper of the selector, between the contact group of the units digit switch and the test wiper of the selector and between the first contact group of the tens digit switch and the source of potential local to the register.

4. A system according to claim 1, and in which the register comprises a tens digit switch and a units digit switch, a first and second group of ten terminals and cooperating wipers for the tens digit switch, a third group of ten terminals and a cooperating wiper for the units digit switch, and in which said sources of potential comprise a potentiometer having a series of tappings and in which multiple connections are provided from the first and second groups of terminals to ten consecutive tappings of the potentiometer, the multipling between the first and second group of terminals being displaced by one, connections are provided from the third group of terminals to consecutive tappings of said potentiometer, only some of the last-mentioned connections being to tappings with which either the first or the second group is connected and all of the common connections running from terminals in the third group differing in position from the terminals in the first and the second groups, and in which the terminal bank of the selector is divided into groups of ten, nine of which are multipled together, connections are provided from said nine terminals to nine consecutive tappings of the potentiometer, the majority of which coincide with the connections of the terminals from the three groups of terminals of the digit switches, but are displaced in numerical order with respect thereto, and means is provided in the register for connecting the detector in four alternative connections: between the brush cooperating with the first terminal group and the test wiper of the selector, between the brush cooperating with the second terminal group and the test wiper of the selector, between the brush cooperating with the third terminal group and the test wiper of the selector, and between the brush cooperating with the first terminal group and the source of potential local to the register.

5. In a telecommunication system, a plurality of lines, means including a final selector for connecting a calling with a called line, said selector having a bank of terminal sets in which the lines terminate, a set of wipers and means for moving said wipers over the terminals, a register, means controlled by the calling line for operating the register to receive and store the digits of the called number, a plurality of different sources of direct potential connected with terminals in said bank and with the register, a signalling wire extending from the final selector to the digit storing means in the register, a detector comprising a gas valve connected to the primary winding of a transformer, the secondary winding being connected with the wire, means responsive to the tens and the units digit received for connecting the register end of the signalling wire over said digit storing means to one of said predetermined sources, means controlled by the register after the receipt of each digit for starting the selector, said selector connecting the selector end of the signalling wire to various of said sources marking the terminals, means responsive to a predetermined difference of potential applied to the ends of the signalling wire during the tens and also during the units selecting movements of the selector for operating said detector, means operative upon each operation of the detector for stopping the selector, and relay means for changing the connections of the signalling wire to the detector after the tens selection to prevent its operation during the units selection in response to the connection in the selector of the same potentials as during the tens selection.

6. In a telecommunication system, a plurality of lines, means including a final selector for connecting a calling with a called line, said selector having a bank of terminal sets in which the lines terminate, a set of wipers and means for moving said wipers over the terminals in the same direction for the tens and the units selections, a register, means controlled by the calling line for operating the register to receive and store the digits of the called number, a plurality of different sources of direct potential connected with the register and with terminals in said bank in such order that the selector wiper can encounter during each selection only one source which bears a predetermined relationship to the potentials connected in the register in response to the digits, a signalling wire extending from the final selector to the digit storing means in the register, a detector comprising a gas valve connected to the primary winding of a transformer, the secondary winding being connected with the wire, means responsive to the tens and the units digit received for connecting the register end of the signalling wire over said digit storing means to one of said predetermined sources, means controlled by the register after the receipt of each digit for starting the selector, said selector connecting the selector end of the signalling wire to various sources marking the terminals, the detector being operated when the gas valve is fired by a surge created in one winding of the transformer when the predetermined potential difference is applied to the other winding thereof during the tens and also during the units selecting movements of the selector, means operative upon each operation of the detector for stopping the selector, means for insuring the continuation of the first selection process when the detector responds for the first time to a difference of potential different from that applied to it when the wanted position is encountered, relay means for following the first response by a second response which causes the selector to continue its rotation while the connections of the signalling wire to the detector are reversed and the register end of the signaling wire placed at a potential such that none of the potentials marking the terminal sets of which one has to be selected can cause a new response of the detector, a suitable potential marking another than one of the afore-mentioned terminal sets to cause a third response of the selector and means responsive to said third response to return to the conditions existing before the first response.

7. In a telecommunication system, a plurality of lines, means including a final selector for connecting a calling with a called line, said selector having a bank of terminal sets in which the lines terminate, a set of wipers and means for moving said wipers over the terminals in the same direction for the tens and the units selections, a register, means controlled by the calling line for operating the register to receive and store the digits of the called number, a plurality of different sources of direct potential connected with the register and with terminals in said bank in such order that the selector wiper can encounter during each selection only one source which bears a predetermined relationship to the potentials connected in the register in response to the digits, a signalling wire extending from the final selector to the digit storing means in the register, a detector comprising a gas valve connected to the primary winding of a transformer, the secondary winding being connected with the wire, means responsive to the tens and the units digit received for connecting the register end of the signalling wire over said digit storing means to one of said predetermined sources, means controlled by the register after the receipt of each digit for starting the selector, said selector connecting the selector end of the signalling wire to various sources marking the terminals, the detector being operated when the gas valve is fired by a surge created in one winding of the transformer when the predetermined potential difference is applied to the other winding thereof during the tens and also during the units selecting movements of the selector, means operative upon each operation of the detector for stopping the selector, means responsive when the terminal set chosen by the first selection is also chosen by the second selection to prevent the selector switch from being set in motion after the first selection and means including a local circuit in the register to cause the detector to respond in said local circuit in the register when the numerical indication corresponding to the terminal set in question is received.

8. In a telecommunication system, a plurality of lines, means including a final selector for connecting a calling with a called line, said selector having a bank of terminal sets in which the lines terminate, a set of wipers and means for moving said wipers over the terminals in the same direction for the tens and the units selections, a register, means controlled by the calling line for operating the register to receive and store the digits of the called number, a plurality of different sources of direct potential connected with the register and with terminals in said bank in such order that the selector wiper can encounter during each selection only one source which bears a predetermined relationship to the potentials connected in the register in response to the digits, a signalling wire extending from the final selector to the digit storing means in the register, a detector comprising a gas valve connected to the primary winding of a transformer, the secondary winding being connected with the wire, means responsive to the tens and the units digit received for connecting the register end of the signaling wire over said digit storing means to one of said predetermined sources, means controlled by the register after the receipt of each digit for starting the selector, said selector connecting the selector end of the signalling wire to various sources marking the terminals, the detector operated when the gas valve is fired by a surge created in one winding of the transformer when the predetermined potential difference is applied to the other winding thereof during the tens and also during the units selecting movements of the selector, means operative upon each operation of the detector for stopping the selector, and means for sufficiently delaying the rotation of the selector with regard to the beginning of the reception to guarantee that the difference of potential to which the ends of the signalling wire are subjected cannot reach the required minimum in value and sign before the numerical indication has been completely received in the register.

9. In a telecommunication system, a plurality of lines, means including a final selector for connecting a calling with a called line, said selector having a bank of terminal sets in which the lines terminate, a set of wipers and means for moving said wipers over the terminals in the same direction for the tens and the units selections, a register, means controlled by the calling line for operating the register to receive and store the digits of the called number, a plurality of different sources of direct potential connected with the register and with terminals in said bank in such order that the selector wiper can encounter during each selection only one source which bears a predetermined relationship to the potentials connected in the register in response to the digits, a signalling wire extending from the final selector to the digit storing means in the register, a detector comprising a gas valve connected to the primary winding of a transformer, the secondary winding being connected with the wire, means responsive to the tens and the units digit received for connecting the register end of the signalling wire over said digit storing means to one of said predetermined sources, means controlled by the register after the receipt of each digit for starting the selector, said selector connecting the selector end of the signalling wire to various sources marking the terminals, the detector being operated when the gas valve is fired by a surge created in one winding of the transformer when the predetermined potential difference is applied to the other winding thereof during the tens and also during the units selecting movements of the selector, means operative upon each operation of the detector for stopping the selector, means for marking a group of several terminal sets, excepting those relative to the first selection, by the same potential and including break contacts over which the marking potentials of all terminal sets except the last of the group are applied, each of which contacts, when open, characterizes the busy condition of the line to which the corresponding terminal set gives access.

WILLY POULIART.

REFERENCES CITED

The following references are of record in the file of this patent:

UNITED STATES PATENTS

| Number | Name | Date |
|---|---|---|
| 1,713,813 | Bellamy | May 21, 1929 |
| 2,238,223 | Kozma | Apr. 15, 1941 |
| 2,242,776 | Clark | May 20, 1941 |
| 2,351,016 | Deakin | June 13, 1944 |
| 2,424,585 | Simon et al. | July 29, 1947 |
| 2,444,065 | Pouliart | June 29, 1948 |
| 2,452,578 | Kruithof et al. | Nov. 2, 1948 |
| 2,454,809 | Kruithof et al. | Nov. 30, 1948 |